United States Patent
Smeets et al.

(10) Patent No.: US 6,585,121 B1
(45) Date of Patent: Jul. 1, 2003

(54) FIXING ELEMENT FOR LINES, IN PARTICULAR FOR A ROTARY AIRER

(75) Inventors: Sven Hubertus Johannes Smeets, Waalre (NL); Antonius Johannes Verbeek, Valkenswaard (NL)

(73) Assignee: Brabantia Nederland B.V., Waalre (NL)

( * ) Notice: Subject to any disclaimer, the term of this patent is extended or adjusted under 35 U.S.C. 154(b) by 0 days.

(21) Appl. No.: 09/857,913

(22) PCT Filed: Oct. 11, 2000

(86) PCT No.: PCT/NL00/00730
§ 371 (c)(1), (2), (4) Date: Jun. 28, 2001

(87) PCT Pub. No.: WO01/27378
PCT Pub. Date: Apr. 19, 2001

(30) Foreign Application Priority Data

Oct. 11, 1999 (NL) .............................. 1013262

(51) Int. Cl.[7] .................................. A47F 5/00
(52) U.S. Cl. ................ 211/119.01; 24/129 R; 24/129 B
(58) Field of Search .......................... 24/129 R, 129 B, 24/129 D; 211/119.15, 119.01, 119.1, 183

(56) References Cited

U.S. PATENT DOCUMENTS

| 749,847 | A | * | 1/1904 | Curtis |
| 1,622,324 | A | * | 3/1927 | Lettre |
| 2,474,922 | A | * | 7/1949 | Unwin ........................ 211/167 |
| 2,903,772 | A | * | 9/1959 | McKinlay |
| 2,932,072 | A | * | 4/1960 | Punchnow |
| 3,409,014 | A | * | 11/1968 | Shannon |
| 4,583,649 | A | | 4/1986 | Brown |
| 4,676,381 | A | * | 6/1987 | Wüster .................. 211/119.01 |
| 5,693,060 | A | * | 12/1997 | Martin |

FOREIGN PATENT DOCUMENTS

| GB | 2244089 | 11/1991 |
| NL | 8200941 | 10/1983 |

* cited by examiner

Primary Examiner—Robert W. Gibson, Jr.

(57) ABSTRACT

A fixing element for connecting the two ends of a line has two pairs of holes extending through the element. Each pair of holes is intended to have an end part of the line threaded through it in the form of a loop. This fixing element is additionally provided with two sockets, and each socket is intended to have a free end, which projects out of the holes, to be fitted through it, all this in such a manner that part of the line which runs towards the said socket overlaps with a part of the line which runs towards a hole in the fixing element, the direction in which the line passes through the sockets being substantially perpendicular to that which the line passes through the said hole

9 Claims, 2 Drawing Sheets

FIXING ELEMENT FOR LINES, IN PARTICULAR FOR A ROTARY AIRER

The invention relates to a fixing element for connecting the two ends of a line, which fixing element has two pairs of holes extending through the element, and each pair of holes is intended to have an end part of the line threaded through it in the form of a loop.

An element of this type is described in U.S. Pat. No. 4,583,649.

Line which is used for washing lines or rotary airers comprises a strong core, which has to absorb the tensile forces acting on the line, and a soft, smooth sheath which imparts thickness to the line and makes it easier to clean the line. The sheath cannot absorb the same level of forces as the core. When the ends of a line material of this nature are being connected to one another, it is important for the connection to act not only on the sheath but also on the stronger core.

When using the fixing element according to the above mentioned U.S. Pat. No. 4,583,649, part of one end of the line fits through a loop at the other end of the line and vice versa. In the event of heavy loads, the resistance to the ends of the line becoming detached from one another may be inadequate, with the result that, when the line is used on a rotary airer, the wet washing which causes the load falls onto the ground.

The object of the invention is to overcome this drawback and to provide the fixing element described in the preamble with a greater resistance, compared to the prior art, against the ends of the line moving with respect to one another.

According to the invention, for this purpose, this fixing element is characterized in that it is additionally provided with two sockets, and each socket is intended to have a free end of the line, which projects out of the holes, to be fitted through it, all this in such a manner that that part of the line which runs towards the said socket overlaps with a part of the line which runs towards a hole in the fixing element, the direction in which the line passes through the sockets being substantially perpendicular to that in which the line passes through the said holes.

Since the ends of the line form an additional bend in order to pass through the sockets, the resistance between the line and the fixing element is increased. On account of the fact that the direction in which the line passes through the sockets is substantially perpendicular to that in which the lines pass through the holes, it is possible to achieve a flat embodiment of the fixing element, even if the ends of the line which project out of the sockets are cut off at some distance from the end of the sockets.

To obtain an even greater resistance between lines and fixing element, it may be advantageous for the sockets to extend in the direction of the connecting line between the holes of the respective pairs of holes. This has a beneficial effect on the friction between lines and fixing element.

The invention also relates to a rotary airer comprising a pole and a number of profiled sections which project from the said pole and have a series of pairs of openings, and lines which are threaded through openings in the profiled sections, which profiled sections are provided with at least one pair of bores which lie opposite one another, each bore being intended to have one end of the said line fitted through it from the outside, and a fixing element being used to fix the two ends of a line with respect to the said profiled section, which fixing element has two pairs of holes extending through the element, and each pair of holes is intended to have an end part of the line threaded through it in the form of a loop. A rotary airer of this type is also known from the above mentioned U.S. Pat. No. 4,583,649. According to the invention, the fixing element is additionally provided with two sockets, and each socket is intended to have the remaining part of that end of the line which has been threaded through a pair of holes in the form of a loop fitted through it, all this in such a manner that that part of the line which runs towards the said socket overlaps that part of the line which runs from an opening in the profiled section towards a hole in the fixing element, the direction in which the line runs through the sockets being substantially perpendicular to that in which the line runs through the said holes. The sockets preferably extend in the direction of the connecting line between the holes of the respective pairs of holes.

The invention will be explained in more detail with reference to the figures, in which.

Figure 1:
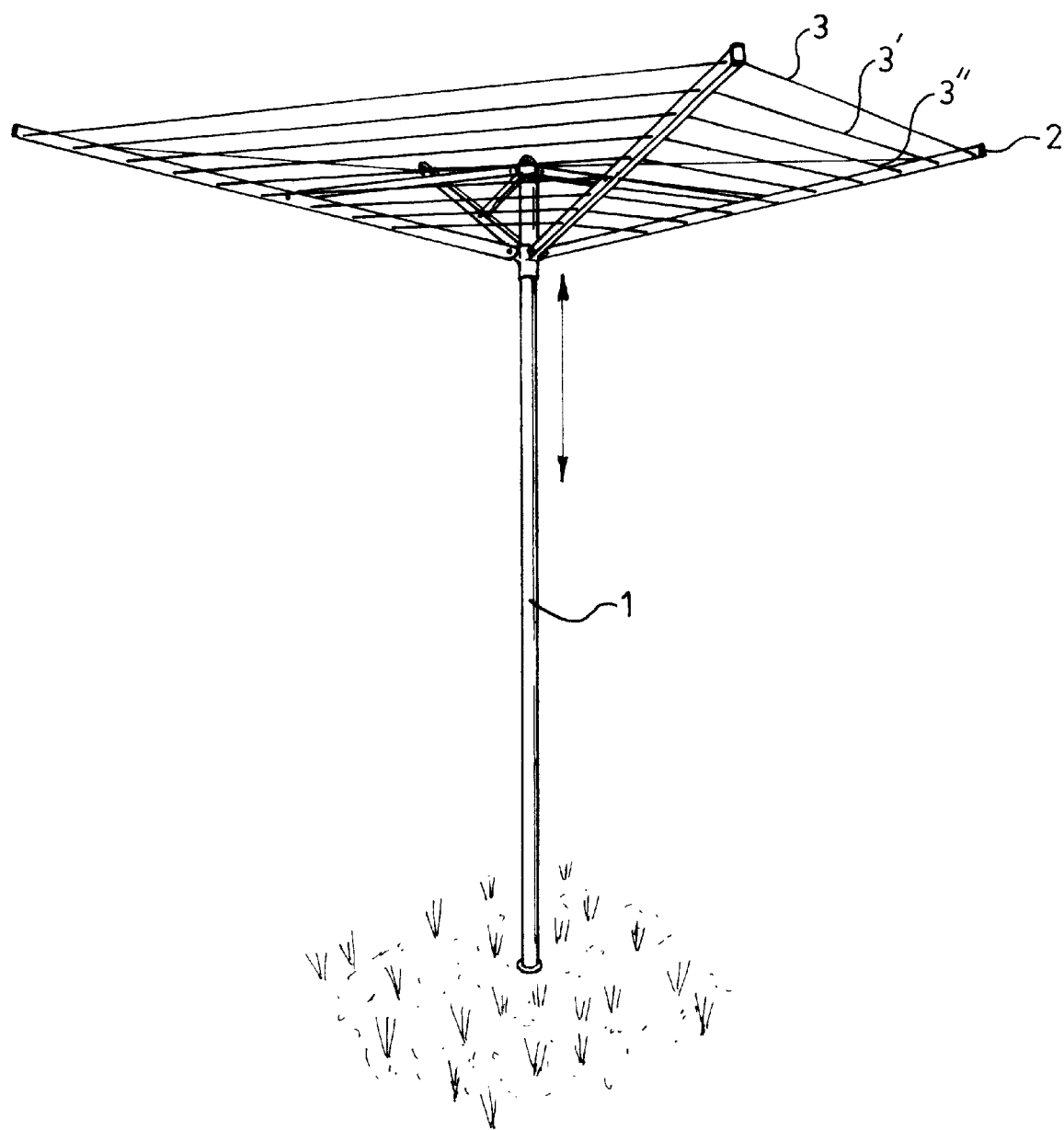
FIG. 1 shows a perspective view of a rotary airer.

FIG. 1 shows a rotary airer, comprising a pole 1, profiled sections 2 which project from the latter and lines 3, 3' and 3" which are tensioned between the said profiled sections. According to the prior art, the lines 3, 3' and 3" run once around the pole 1 and are then attached to one another by their start and end.

As has been stated, if the lines 3, 3' or 3' break, they can be replaced by new lines. It is desirable for it to be possible for the start and end of a new line to be connected quickly and easily by the consumer himself. Moreover, it must be easily possible for the length of the line to be selected in such a way that the lines, when the airer has been opened, are under a desired tension.

Since the lines may move when the rotary airer is being opened and closed and while it is being stored, the forces acting on the lines when the airer is opened may be considerable. Furthermore, the forces may also increase to quite a considerable extent as a result of wet washing being hung from the lines. Therefore, it is important for the fixing of the lines to be robust.

Figure 2:
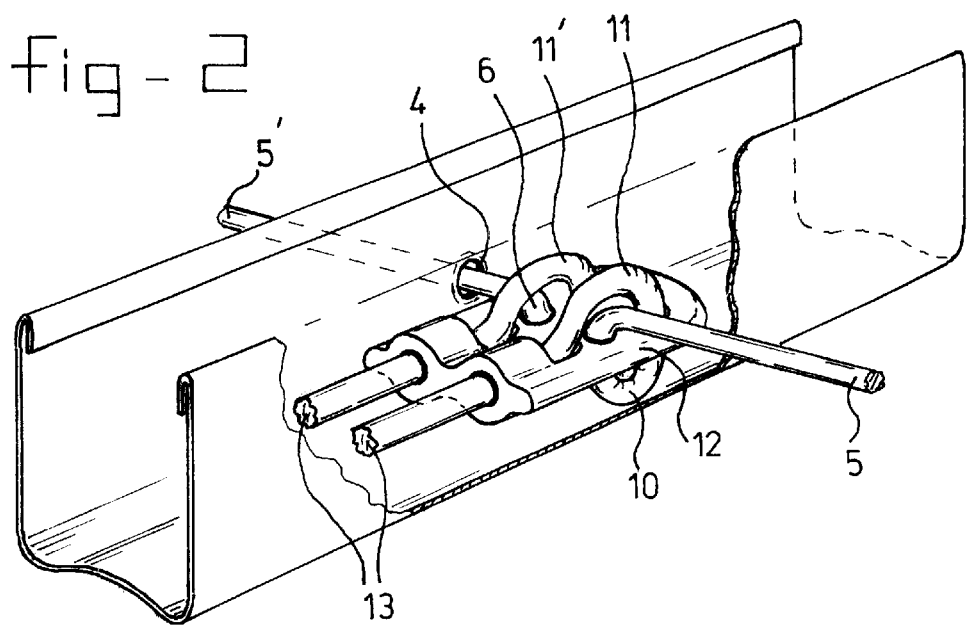
FIG. 2 shows part of a projecting profiled section of the rotary airer accommodating two lines which are connected using the fixing element shown in FIG. 3.
Figure 3:
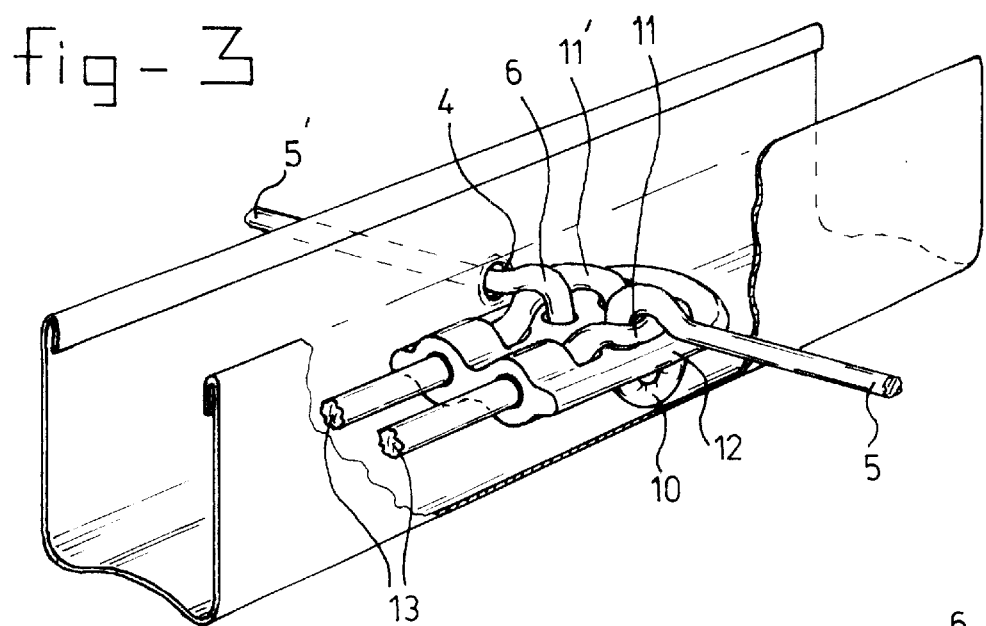
FIG. 3 shows a variant of the design shown in FIG. 2.
Figure 4:
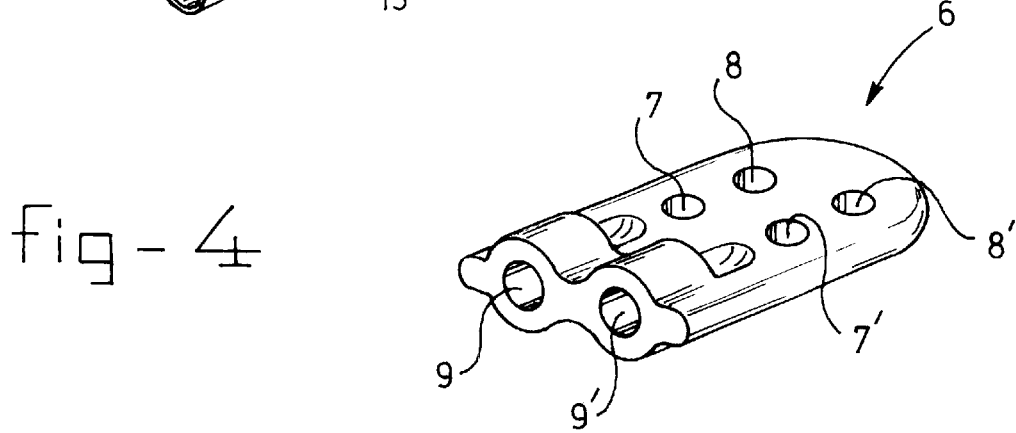
FIG. 4 shows an embodiment of the fixing element according to the present invention.

FIGS. 2 and 3 show embodiments of the fixing element 6 according to the present invention as it is used for fixing the line 3 in a rotary airer. Part of a protruding profiled section 2 is shown, which is provided with cut-outs 4, only one of which can be seen, through which the ends 5 and 5' of the line 3 run towards the fixing element 6. After they have passed through the cut-outs, the ends 5, 5' pass through the holes 8, 7 and 8', 7', respectively, and then through the sockets 9 and 9', respectively. The course of the lines is illustrated in FIGS. 2 and 3, while the numbering of the components of the fixing element can be seen more clearly from FIG. 4.

The position of the line 3 as illustrated in FIGS. 2 and 3 is eminently suitable for adjustment of its length. Since, in this position, the ends 5, 5' have not yet been lodged taut in the cut-outs in the fixing element 6, the bends 10 and 11 are not yet sharp, and the line is still scarcely acting on the element 6. When the line 3 has been adjusted to the correct length, it is possible, as a result of the line ends 5, 5' being secured with respect to the fixing element 6 at the points 12 and the ends 13 of the line 3 being pulled, to pull the line ends 5, 5' taut inside the element 6, so that the final connection is obtained.

The lines can best be fitted by opening the airer and, in this way, determining the desired length of the line 3. When the correct length of the lines has been found, the fixing element, provided the line is not subjected to extreme loads, will hold it at the correct length. Then, by sufficiently pulling the line ends 5, 5' in the manner described above, it is possible to obtain the connection between the line 3 and the fixing element 6, while the length of the line 3 remains unchanged.

To enable the fixing element 6 to function correctly, the internal diameter of the holes and sockets 7, 8, 9, 7', 8', 9' is selected to be approximately equal to the external diameter of the line 3. If the distance between the respective holes 7, 8; 7', 8' of the pairs of holes is selected to be small compared to the diameter of the line 3, the bends 10, 11; 11' will make a substantial contribution to the force which is required in order to pull the ends 5, 5' out of the element 6. It is also advantageous for the sockets 9, 9' to be positioned in such a way that the bend 11 is as sharp as possible.

It should be noted that, despite the fact that the fixing element is described only in combination with a dryer, elements of this nature can also be used to good effect for numerous other applications.

What is claimed is:

1. A rotary airer comprising:
   a) a pole;
   b) a number of transversely profiled sections projecting from the pole, each profiled section having a series of openings to receive a plurality of lines extending around the pole;
   c) a plurality of lines threaded through respective openings in the profiled sections to extend in a first direction around the pole and transversely to the profiled section; and
   d) a fixing element disposed in at least one of the profiled section for connecting two ends of one of the lines, the fixing element comprising:
      i) a line supporting member having a top surface and a bottom surface;
      ii) two pairs of holes, each pair comprising a first hole and a second hole, the first and second holes extending through the line supporting member between the top and bottom surfaces, wherein one line end can be threaded through one of the two pairs of holes to form a loop and a free end and another line end can be threaded through the other pair of holes to form another loop and another free end; and
      iii) two sockets integral with the line supporting member to receive the free ends of the line;

wherein the sockets are positioned and oriented for the free ends of the line to overlie and extend transversely of the respective line end extending in said first direction.

2. A rotary airer as claimed in claim 1, wherein the sockets extend approximately perpendicularly to said first direction.

3. A rotary airer as claimed in claim 1 wherein said fixing element comprises only two sockets.

4. A rotary airer as claimed in claim 1 wherein the sockets are positioned and oriented for the free ends of the line to overlie and extend approximately perpendicularly to the line extending in said first direction.

5. A rotary airer as claimed in claim 1 wherein each socket extends in the direction of the connecting line between the respective pair of holes of the fixing element.

6. A rotary airer as claimed in claim 1 wherein the profiled sections have a channel-shaped profile, the channel shape comprising two side walls and a floor, each side wall having said series of openings, the openings in one side wall being aligned with the openings in the other side wall.

7. A rotary airer as claimed in claim 1 wherein the holes and sockets have diameters approximately equal to the diameter of the respective lines.

8. A fixing element as claimed in claim 1 wherein the distance between the holes of each pair of holes is small compared to the diameter of the line to be threaded through the holes.

9. A rotary airer as claimed in claim 1 wherein said fixing element comprises only two sockets, each socket extends approximately perpendicularly to said first direction and extends in the direction of the connecting line between the respective pair of holes of the fixing element, and the profiled sections have a channel-shaped profile, the channel shape comprising two side walls and a floor, each side wall having said series of openings, the openings in one side wall being aligned with the openings in the other side wall.

\* \* \* \* \*